(12) United States Patent
Cordes et al.

(10) Patent No.: US 11,433,745 B2
(45) Date of Patent: Sep. 6, 2022

(54) VEHICLE DOOR ASSEMBLY

(71) Applicant: Nissan North America, Inc., Franklin, TN (US)

(72) Inventors: Luke Cordes, Bloomfield Hills, MI (US); Michael Enochs, Brighton, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/163,147

(22) Filed: Jan. 29, 2021

(65) Prior Publication Data

US 2022/0242203 A1 Aug. 4, 2022

(51) Int. Cl.
*B60J 5/04* (2006.01)
*B62D 25/04* (2006.01)

(52) U.S. Cl.
CPC ........... *B60J 5/0423* (2013.01); *B60J 5/0413* (2013.01); *B60J 5/0415* (2013.01); *B60J 5/0416* (2013.01); *B60J 5/0433* (2013.01); *B60J 5/0469* (2013.01); *B62D 25/04* (2013.01)

(58) Field of Classification Search
CPC . B60J 5/043; B60J 5/042; B60J 5/0422; B60J 5/413; B60J 5/0415; B60J 5/0423; B60J 5/0433; B60J 5/0434; B60J 5/0452; B60J 5/0453; B60J 5/0456

USPC .................... 296/202, 146.6, 193.06, 187.12
See application file for complete search history.

(56) References Cited

U.S. PATENT DOCUMENTS

2021/0237543 A1  8/2021 Itou et al.

FOREIGN PATENT DOCUMENTS

CN         105473422 B  * 11/2017  ........... B62D 25/025

* cited by examiner

*Primary Examiner* — Dennis H Pedder
(74) *Attorney, Agent, or Firm* — Global IP Counselors, LLP

(57) ABSTRACT

A vehicle door assembly includes an inner door panel, a pillar panel and a first cushioning pad. The inner door panel has an attachment area, a first edge portion and a second edge portion, with the first edge portion defining hinge attachment locations. The pillar panel is fixedly attached to at least the second edge portion and the attachment area such that the inner door panel and the pillar panel define a hollow B-pillar structure. The pillar panel further includes an offset portion that is spaced apart from a central portion of the attachment area of the inner door panel such that the attachment area and the offset portion define a recessed area therebetween. The first cushioning pad has a main body installed within the recessed area between the offset portion of the pillar panel and the inner door panel.

16 Claims, 12 Drawing Sheets

VEHICLE DOOR ASSEMBLY

BACKGROUND

Field of the Invention

The present invention generally relates to a vehicle door structure. More specifically, the present invention relates to a vehicle door structure that includes guard beams and cushioning pads that are designed to absorb impact force during an impact event.

Background Information

Modern vehicles are regularly being re-designed and re-engineered to include design features and components that absorption and/or deflect impacting forces during an impact event.

SUMMARY

One object of the present disclosure is to provide a vehicle door with at least one force absorbing cushioning pad strategically positioned within the vehicle door that absorbs at least a portion of impacting force applied to the vehicle door during an impact event.

In view of the state of the known technology, one aspect of the present disclosure is to provide a vehicle door assembly with an inner door panel, a pillar panel and a first cushioning pad. The inner door panel has an attachment area, a first edge portion and a second edge portion, with the first edge portion defining hinge attachment locations. The pillar panel is fixedly attached to at least the second edge portion and the attachment area such that the inner door panel and the pillar panel define a hollow B-pillar structure. The pillar panel further includes an offset portion that is spaced apart from a central portion of the attachment area of the inner door panel such that the attachment area and the offset portion define a recessed area therebetween. The first cushioning pad has a main body installed within the recessed area between the offset portion of the pillar panel and the inner door panel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
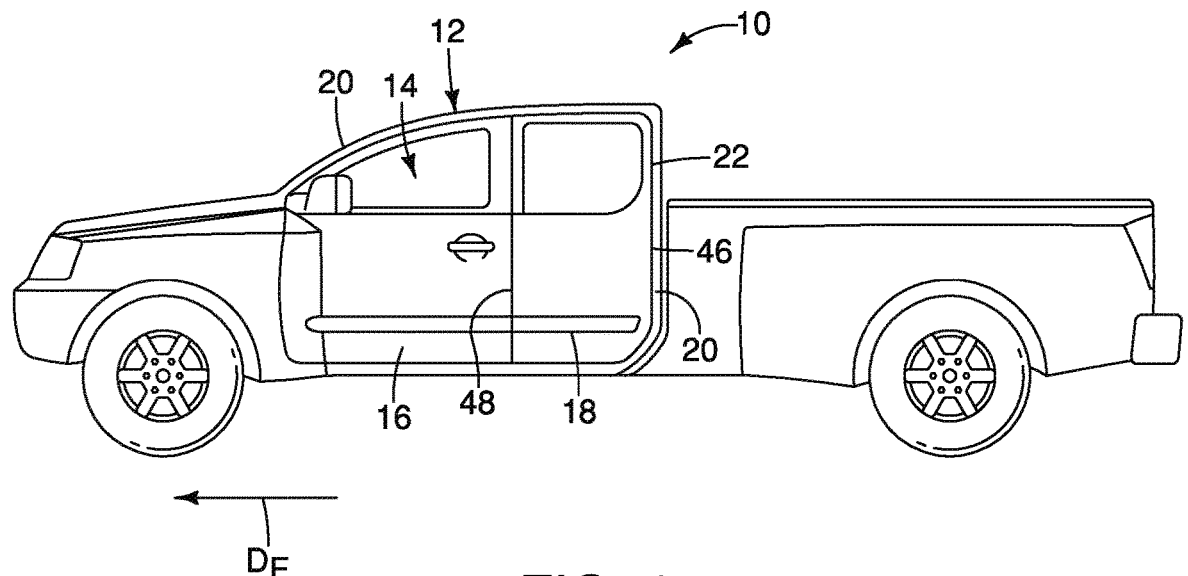
FIG. 1 is a side view of a vehicle having a front door and a rear door that are shown in closed orientations in accordance with an exemplary embodiment.
Figure 2:
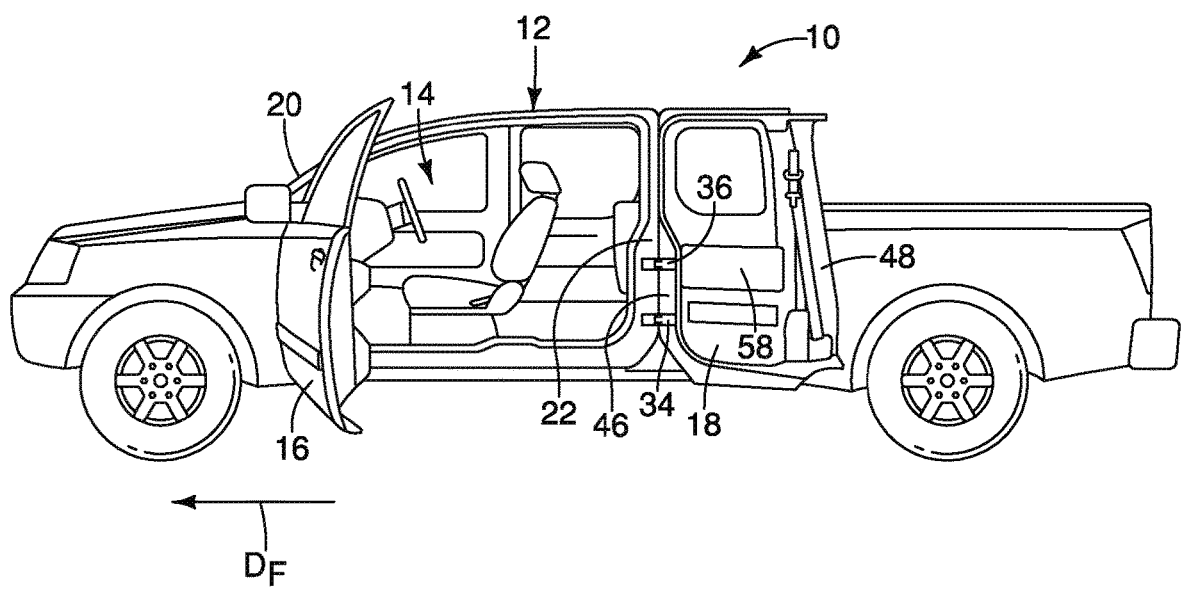
FIG. 2 is another side view of the vehicle showing the front door and the rear door in open orientations in accordance with the exemplary embodiment.

Referring initially to FIGS. 1 and 2, a vehicle 10 is illustrated in accordance with a first embodiment. The vehicle 10 includes a vehicle body structure 12 that defines a passenger compartment 14 that is accessed by front doors 16 and rear doors 18. Only one front door 16 and only one rear door 18 are shown in FIGS. 1 and 2. Since front doors are typically included on both sides of a vehicle, description of only one of the front doors 16 is provided below for the sake of brevity. Further, the depicted rear door 18 will be described herein below and its description applies equally to both rear doors 18.

The front door 16 and the rear door 18 are configured such that they cover the depicted side of the passenger compartment 14 when in the closed orientation shown in FIG. 1. With the front door 16 and the rear door 18 in their respective open orientations as shown in FIG. 2, the passenger compartment 14 is accessible and can be entered or exited from.

The vehicle body structure 12 includes an A-pillar 20 adjacent to a forward end of the front door 16 and a C-pillar 22 adjacent to a rearward end of the rear door 18. The vehicle body structure 12 itself does not include a B-pillar. However, as is described in greater detail below, the rear door 18 includes panels that define pillar that serves as a B-pillar with the rear door 18 in the closed orientation. The vehicle 10 and vehicle body structure 12 define a vehicle forward direction DF, as shown in FIGS. 1 and 2, and shown in various other figures to provide an orientation relative to the vehicle 10.

Figure 3:
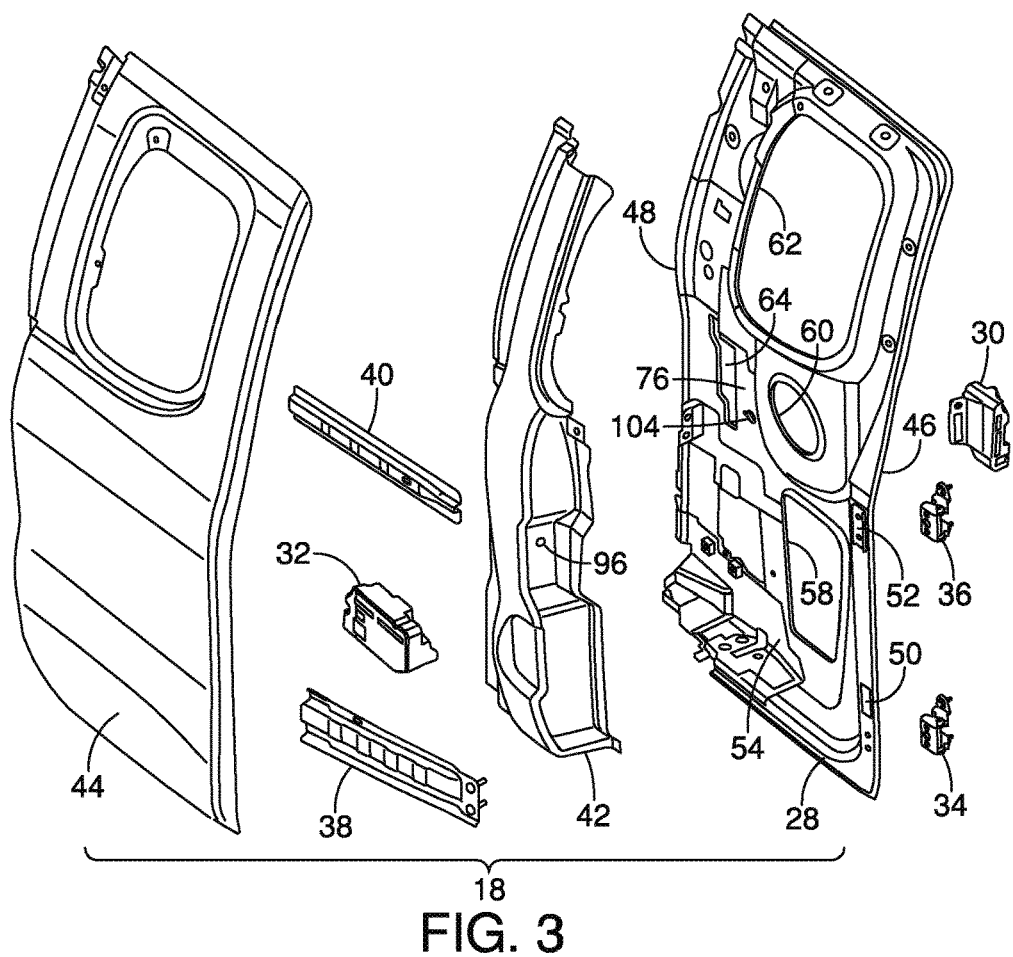
FIG. 3 is an exploded perspective view showing an inner door panel, a pillar panel, a first cushioning pad, a second cushioning pad, a stiffener, a guard beam and an outer door panel in accordance with the exemplary embodiment.
Figure 4:
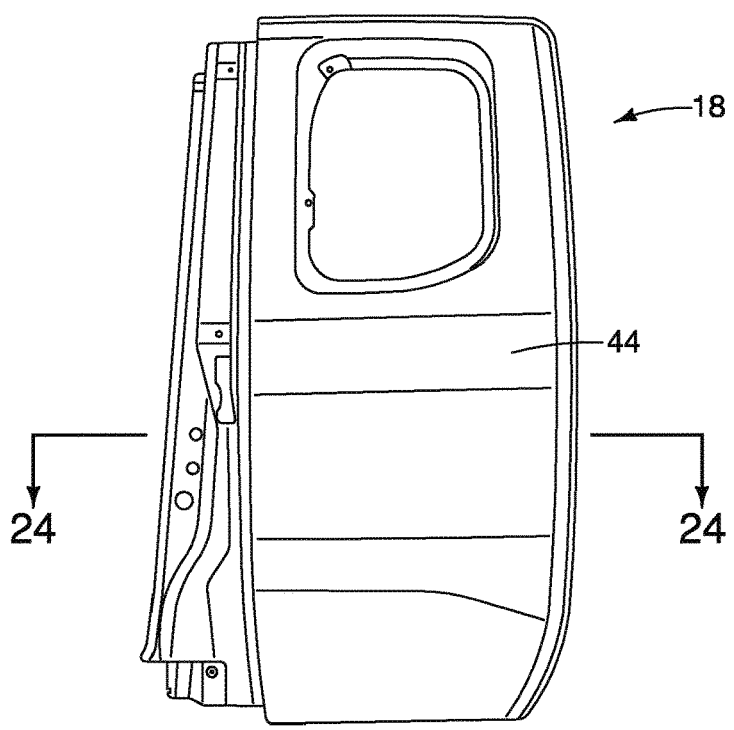
FIG. 4 is a side view of the rear door (the vehicle door assembly) shown removed from the vehicle in accordance with the exemplary embodiment.
Figure 5:
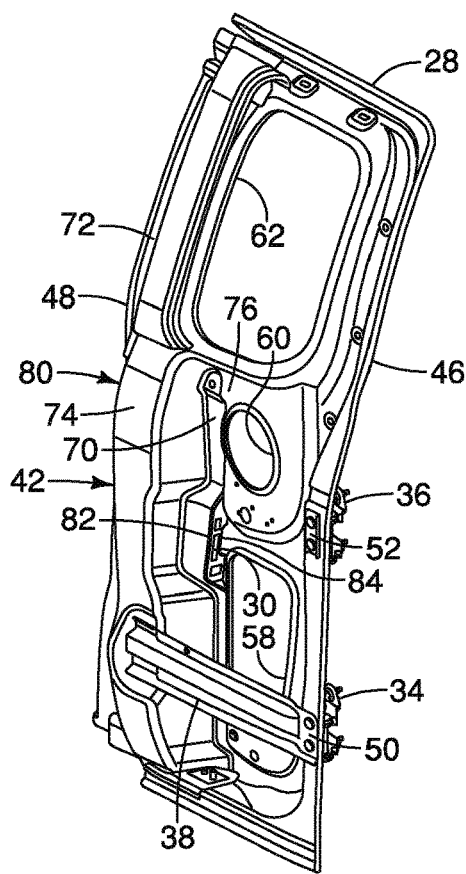
FIG. 5 is a perspective view of the rear door with the outer door panel, the second cushioning pad and the stiffener removed showing the pillar panel and the guard beam attached to the inner door panel, and, with the first cushioning pad installed within a recessed area defined between the pillar panel and the inner door panel in accordance with the exemplary embodiment.
Figure 6:
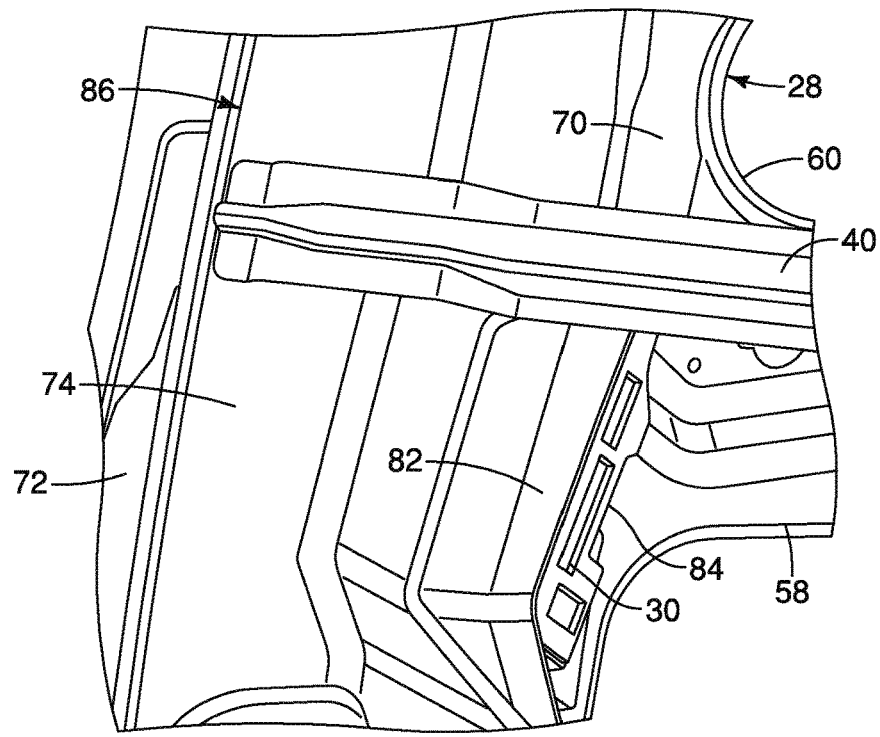
FIG. 6 is a perspective view of a central area of the rear door similar to FIG. 5 with the outer door panel and the second cushioning pad removed showing the first pad installed within the recessed area between the pillar panel and the inner door panel with a portion of the stiffener overlaying an upper end of the recessed area and the first pad in accordance with the exemplary embodiment.
Figure 7:
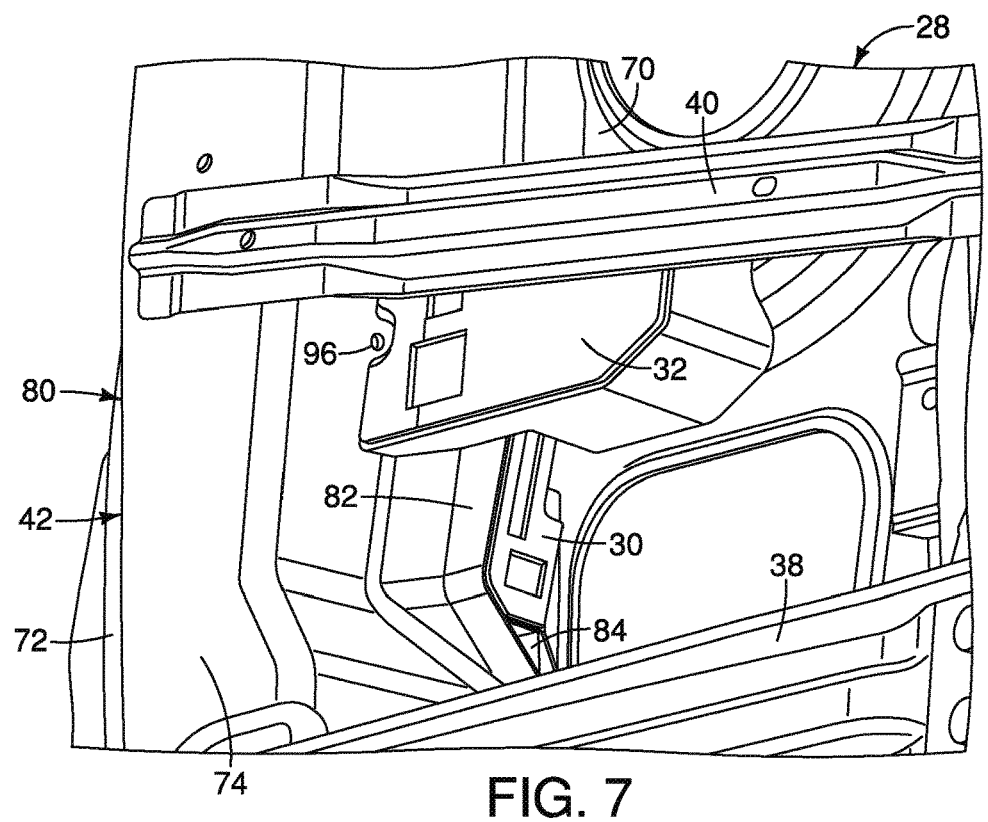
FIG. 7 is a perspective view similar to FIG. 6 showing the central area of the rear door with the outer door panel removed showing the first cushioning pad installed within the recessed area, with the second cushioning pad installed over a portion of the pillar panel and the inner door panel with a portion of the stiffener overlaying a portion of the second pad in accordance with the exemplary embodiment.
Figure 8:
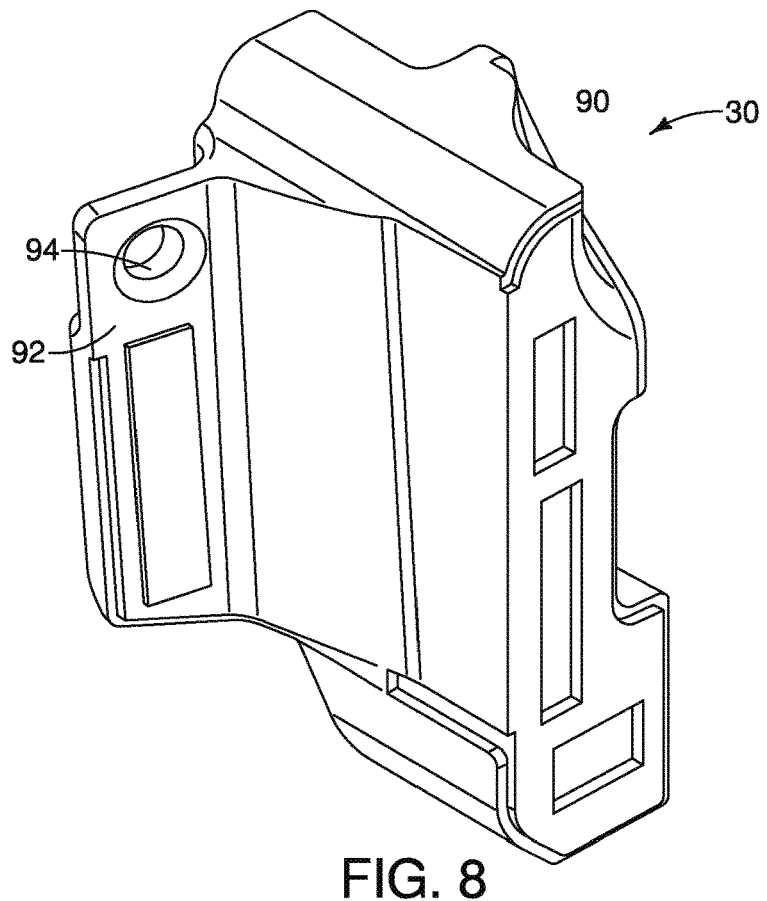
FIG. 8 is a perspective view of the first cushioning pad removed from the rear door showing a main body and an attachment flange 92 in accordance with the exemplary embodiment.
Figure 9:
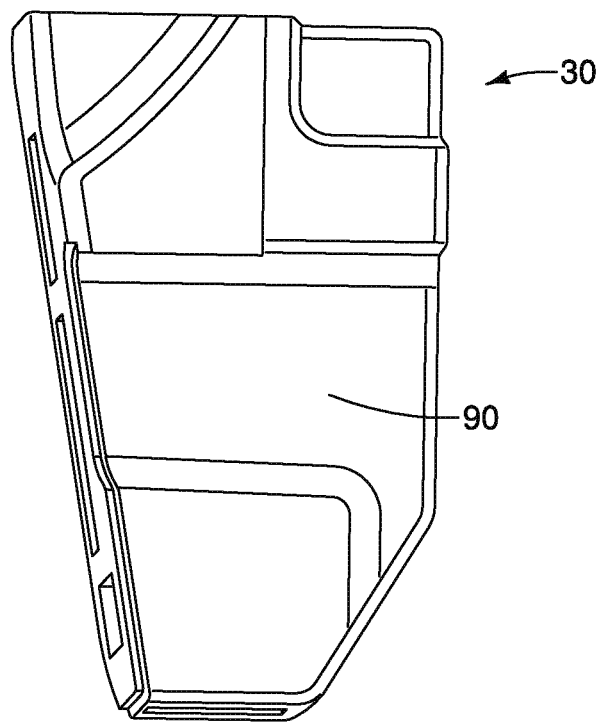
FIG. 9 is another perspective view of the first cushioning pad in accordance with the exemplary embodiment.
Figure 10:
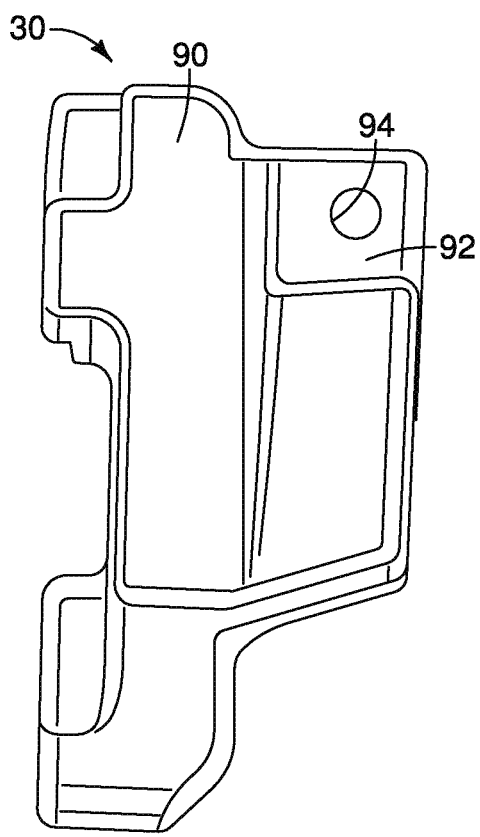
FIG. 10 is a side view of the first cushioning pad in accordance with the exemplary embodiment.
Figure 11:
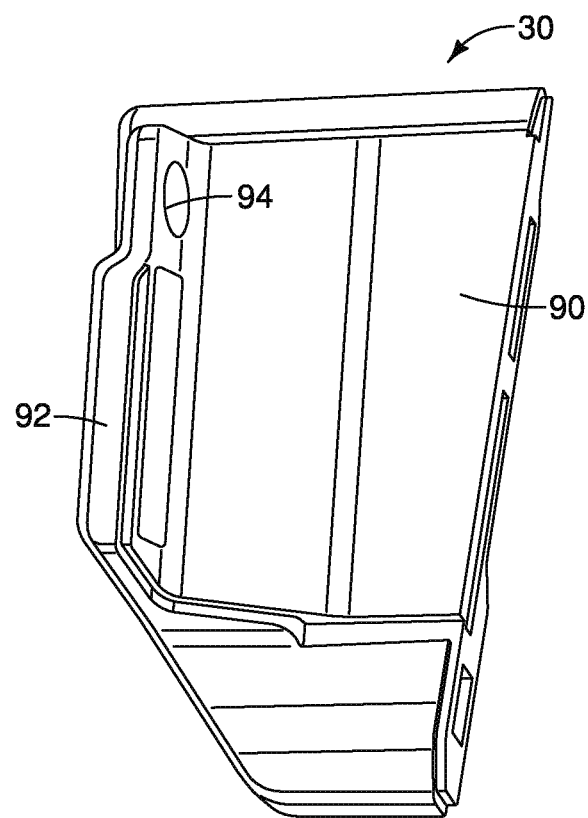
FIG. 11 is yet another perspective view of the first cushioning pad in accordance with the exemplary embodiment.
Figure 12:
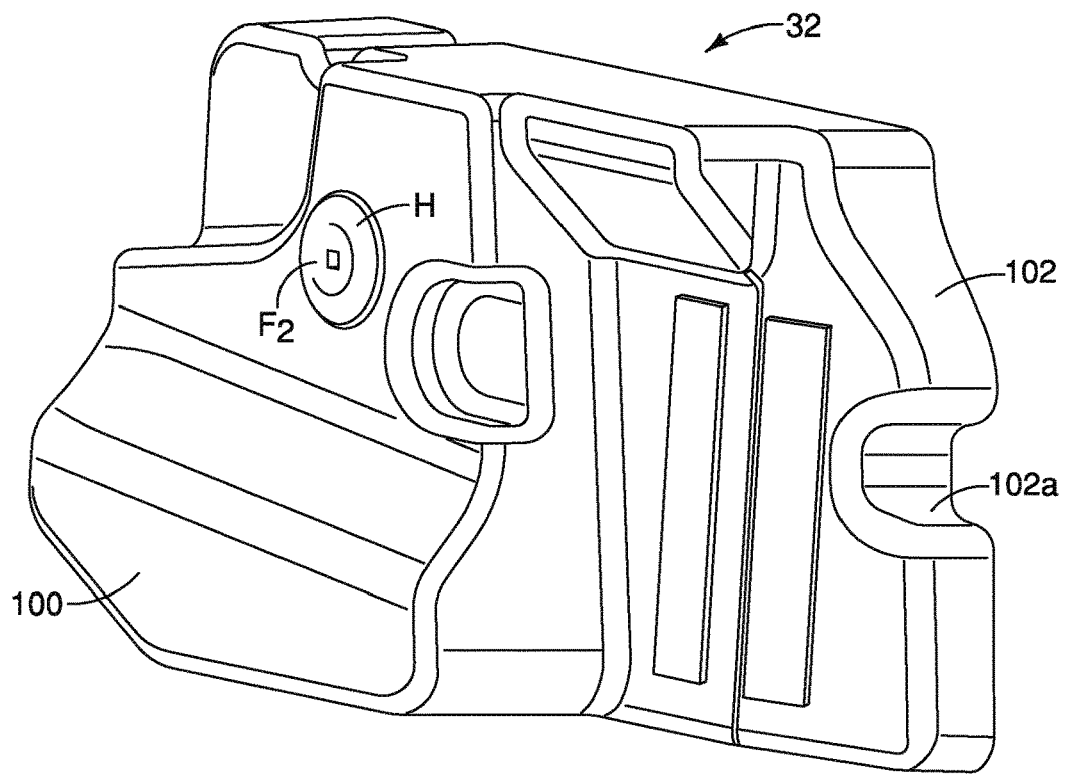
FIG. 12 is a perspective view of the second cushioning pad shown removed from the rear door in accordance with the exemplary embodiment.

A description of the rear door 18 (also referred to herein as a vehicle door assembly 18) is now provided with initial reference to FIGS. 3-5. As shown in FIG. 3, the rear door 18 includes at least an inner door panel 28, a first pad 30, a second pad 32, a first hinge 34, a second hinge 36, a guard beam 38, a stiffener 40, a pillar panel 42 and an outer door panel 44. The rear door 18 also includes various elements and components that are not shown, such as a window regulator, window glass, lock mechanism, latch mechanism and latch operating handle. Since these elements and components are conventional features, further description of these non-depicted elements and components is omitted for the sake of brevity.

As shown in FIGS. 1 and 2, the front door 16 includes hinges at a forward edge thereof such that a rearward end of the front door 16 is pivoted outward and forward relative to the vehicle body structure 12 when moved from the closed orientation to the open orientation. The rear door 18, on the other hand, includes the first and second hinges 34 and 36 at a rearward edge thereof such that a forward end of the rear door 18 is pivoted outward and rearward relative to the vehicle body structure 12 when moved from the closed orientation to the open orientation.

The inner door panel 28 has a first edge portion 46 (a rearward edge) and a second edge portion 48 (a forward edge). The first edge portion 46 has a first hinge attachment location 50 and a second hinge attachment location 52 located above the first hinge attachment location 50. The first hinge 34 is attached to the first hinge attachment location 50 via mechanical fasteners and the second hinge 36 is attached to the second hinge attachment location 52 via mechanical fasteners.

The inner door panel 28 further includes an outboard surface 54 (FIG. 3) and an inboard surface 56 (FIGS. 2 and 16-18). As shown in FIG. 3, the inner door panel 28 includes at least four openings that extend from the outboard surface 54 to the inboard surface 56. Specifically, the inner door panel 28 includes a lower opening 58, an upper opening 60, a window opening 62 and an access opening 64.

The pillar panel 42 is a vertically oriented panel that includes a first attachment flange 70, a second attachment flange 72 and a contoured section 74 therebetween. The first attachment flange 70 is attached to the inner door panel 28 at an upright section of the inner door panel herein after revered to as an attachment area 76 of the inner door panel 28. The attachment area 76 extends along the window opening 62 and extends downward therefrom to an area between the upper opening 60 and the access opening 64, as shown in FIGS. 3 and 5. Specifically, the first attachment flange 70 is welded to the attachment area 76 of the inner door panel 28.

The second attachment flange 72 of the pillar panel 42 is fixedly attached to the second edge portion 52 of the inner door panel 28 such that an area of inner door panel 28 located between the second edge portion 48 and the attachment area 76 along with the contoured section 74 of the pillar panel 42 define a hollow B-pillar structure 80. More specifically, the second attachment flange 72 of the pillar panel 42 is welded to the second edge portion 52 of the inner door panel 28.

While the hollow B-pillar structure 80 is not a B-pillar of the vehicle body structure 12 per se, the hollow B-pillar structure 80 serves as a B-pillar to the vehicle body structure 12 with the rear door 18 in the closed orientation.

Figure 16:
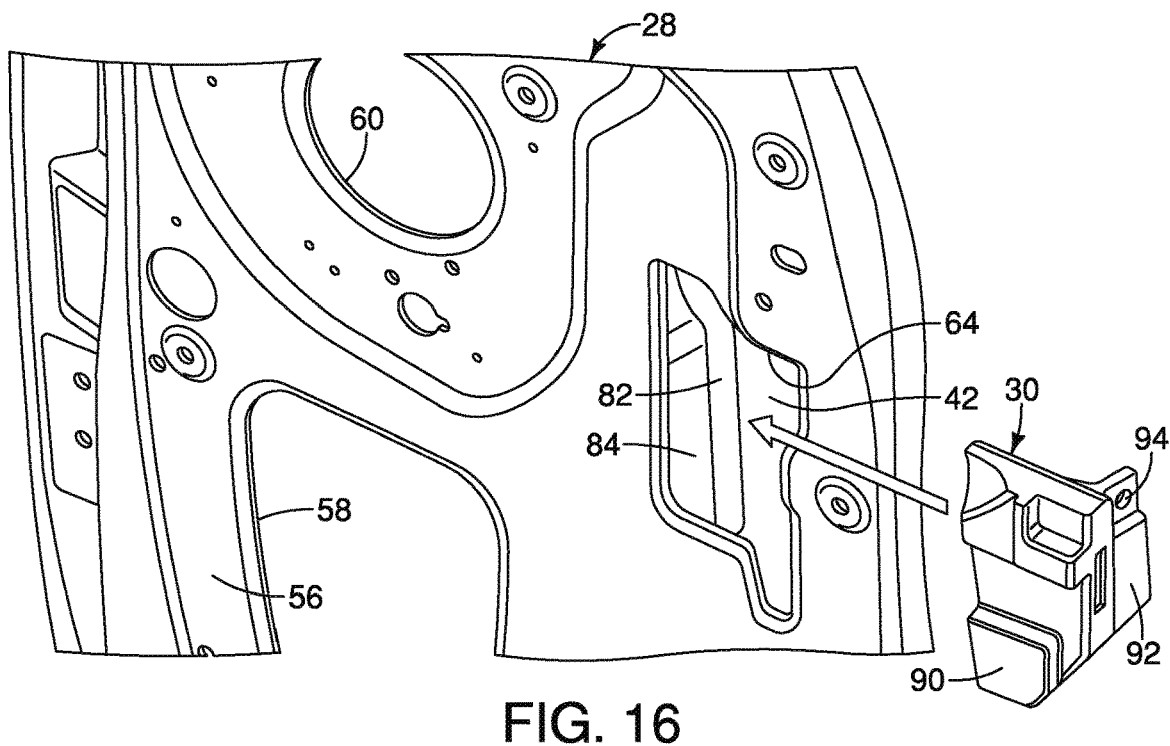
FIG. 16 is a perspective view of an inboard side of the inner door panel showing an access opening that exposes a portion of the recessed area between the pillar panel and the inner door panel with the first cushioning pad oriented for insertion into the access opening and the recessed area in accordance with the exemplary embodiment.
Figure 17:
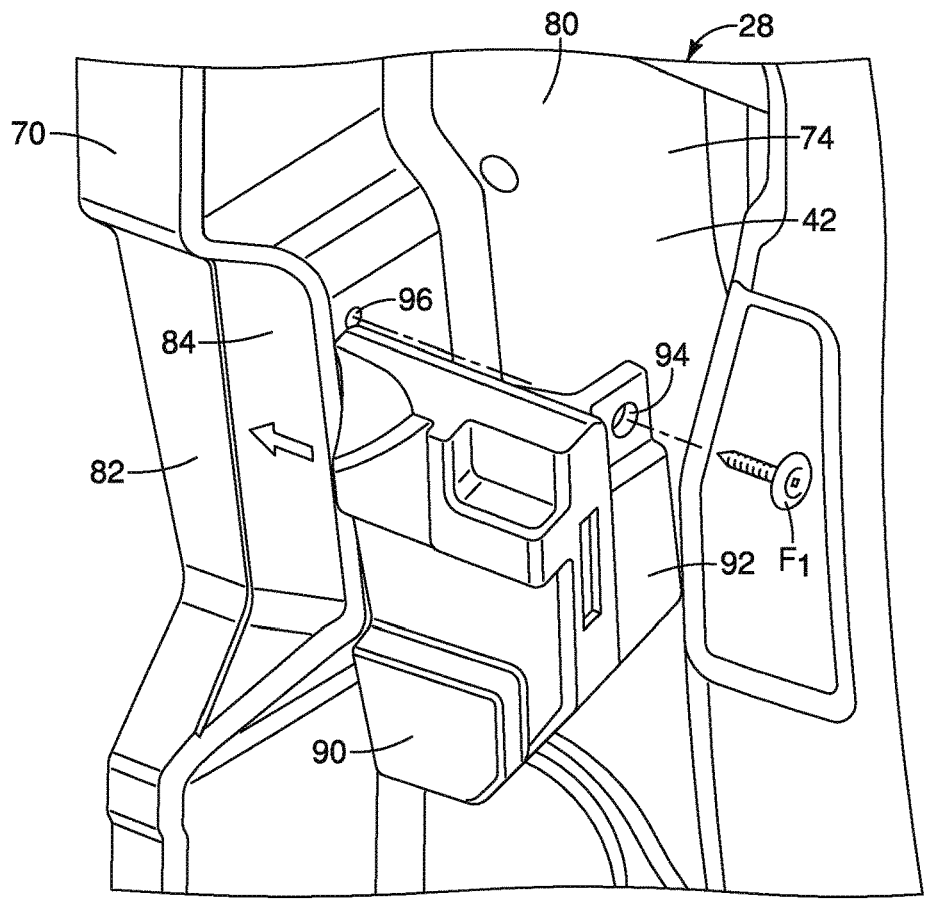
FIG. 17 is a perspective view of an inboard side of the pillar panel with the inner panel removed showing an offset portion of the pillar panel that partially defines the recessed area with the first cushioning pad oriented for insertion into the recessed area in accordance with the exemplary embodiment.
Figure 18:
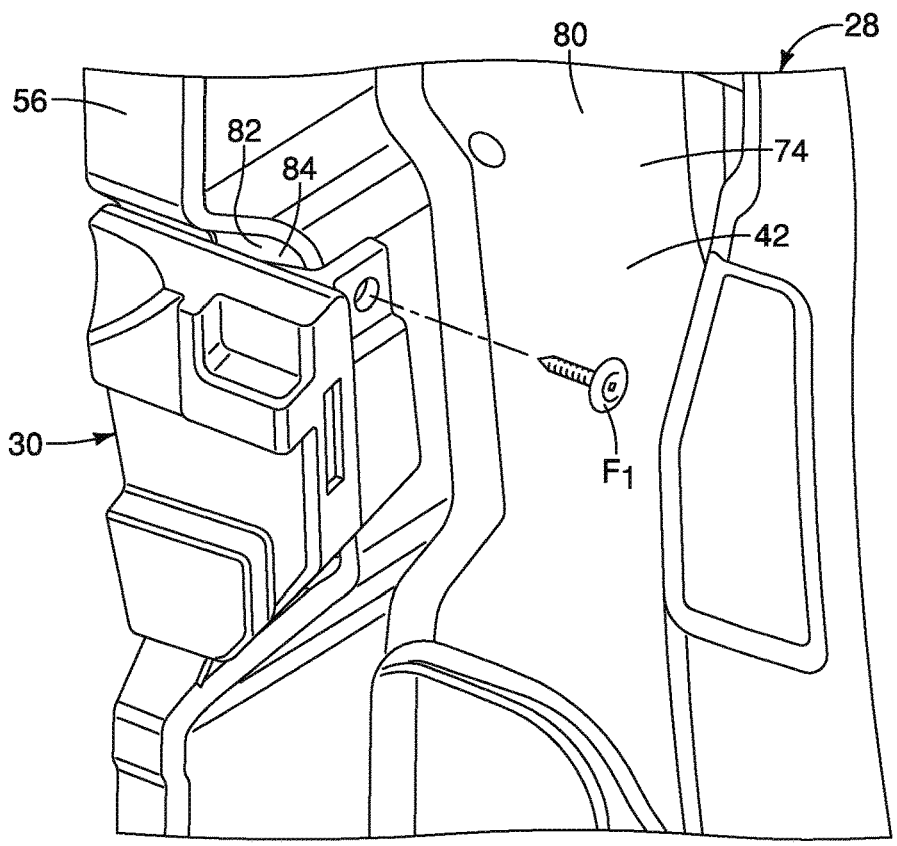
FIG. 18 is a perspective view similar to FIG. 17 of the inboard side of the pillar panel with the inner panel removed showing the first cushioning pad positioned within the offset portion and a fastener ready for insertion onto an opening in the attachment flange of the first cushioning pad and a corresponding opening in the pillar panel in accordance with the exemplary embodiment.

The first attachment flange 70 of the pillar panel 42 includes a offset portion 82 that is spaced apart from the adjacent portion of the attachment area 76. Once the pillar panel 42 is fixed to the inner door panel 28, the offset portion 82 and the adjacent surface of the inner door panel 28 defines a pocket or recessed area 84. The recessed area 84 is open at both ends. Specifically, the recessed area 84 is open to the hollow interior of the hollow B-pillar structure 80, as shown in FIGS. 16-18, and, is open to the interior of the rear door 18, as shown in FIGS. 3 and 5-7.

After the pillar panel 42 is welded to the inner door panel 28, a first end of the guard beam 38 is attached via mechanical fasteners to the first hinge attachment location 50 and the first hinge 34. A second end of the guard beam 38 is welded to the pillar panel 42. It should be understood from the drawings and the description herein that once the pillar panel 42 is welded to the inner door panel 28, the pillar panel 42 is now a fixed part of the inner door panel 28 defining the hollow B-pillar structure 72.

The stiffener 40 is further welded to an area adjacent to the first edge portion 46 of the inner door panel 28 and to the pillar panel 42. The stiffener 40 is also referred to as a guard beam hereinbelow. To simplify this description, the stiffener 40 is referred to as such in order to distinguish from the guard beam 38. However, it should be understood from the drawings and the description herein that the stiffener 40 is a guard beam that provides resistance to deformation of the rear door 18 during a possible impact event where force acts on the rear door 18.

After the inner door panel 28, the pillar panel 28, the first pad 30, the second pad 32 (as described further below), the stiffener 40 and the guard beam 38 are all fixedly assembled together, the outer door panel 44 is attached to the inner door panel 28 covering and concealing the second pad 32, the guard beam 38, the stiffener 40 and the pillar panel 42. The outer door panel 44 can be, for example, welded to the first edge portion 46 and the second edge portion 48 of the inner door panel 28. The outer door panel 44 can further be welded or otherwise fixed to upper and lower edges of the inner door panel 28.

A description is now provided of the first pad 30 (also referred to as the first cushioning pad 30) with initial reference to FIGS. 8-11 and 16-18. The first pad 30 is dimensioned and configured to absorb a portion of impact energy during an impact event that might impact the rear door 18. The first pad 30 provides a cushioning effect, and hence is also referred to as the cushioning pad 30. The first pad 30 and the second pad 32 are both made of a dense foam material, such as a polymer material, resin material or other suitable impact absorbing material. The first pad 30 and the second pad 32 are provided with differing densities. Specifically, the first pad 30 is less dense than the second pad 32. In other words, the second pad 32 is more resistant to compression than the first pad 30.

The first pad 30 includes a main body 90 and an attachment flange 92, as shown in FIGS. 8-11. The main body 90 has an overall block-like rectangular shape with the attachment flange 92 extending from one end thereof. The attachment flange 92 includes an opening 94 dimensioned to receive a fastener $F_1$ that is fitted into an opening 96 in inner door panel 28, as described in greater detail below. The overall shape of the first pad 30 can vary from vehicle to vehicle. In the depicted embodiment, the first pad 30 is dimension to fit into the pocket or recessed area 84 defined between the inner door panel 28 and the first attachment flange 70 of the pillar panel 42, as described further below.

Figure 13:
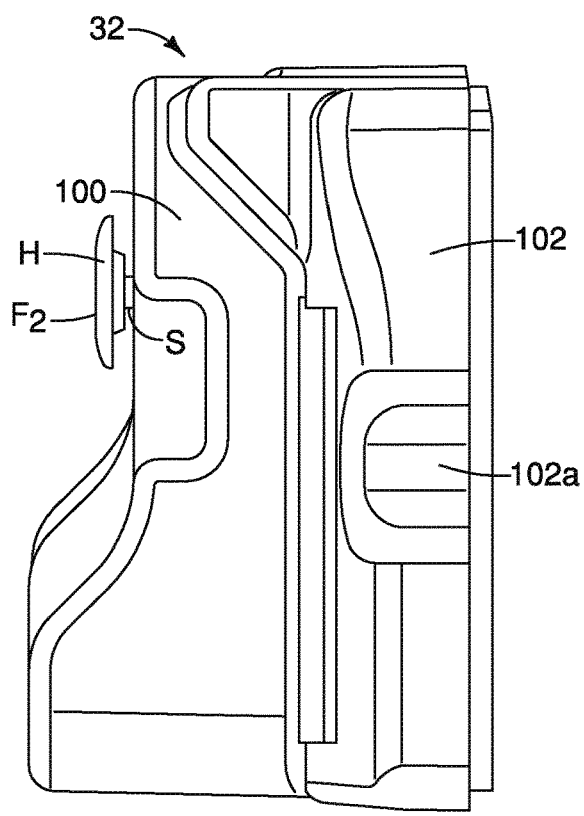
FIG. 13 is an end view of the second cushioning pad in accordance with the exemplary embodiment.
Figure 14:
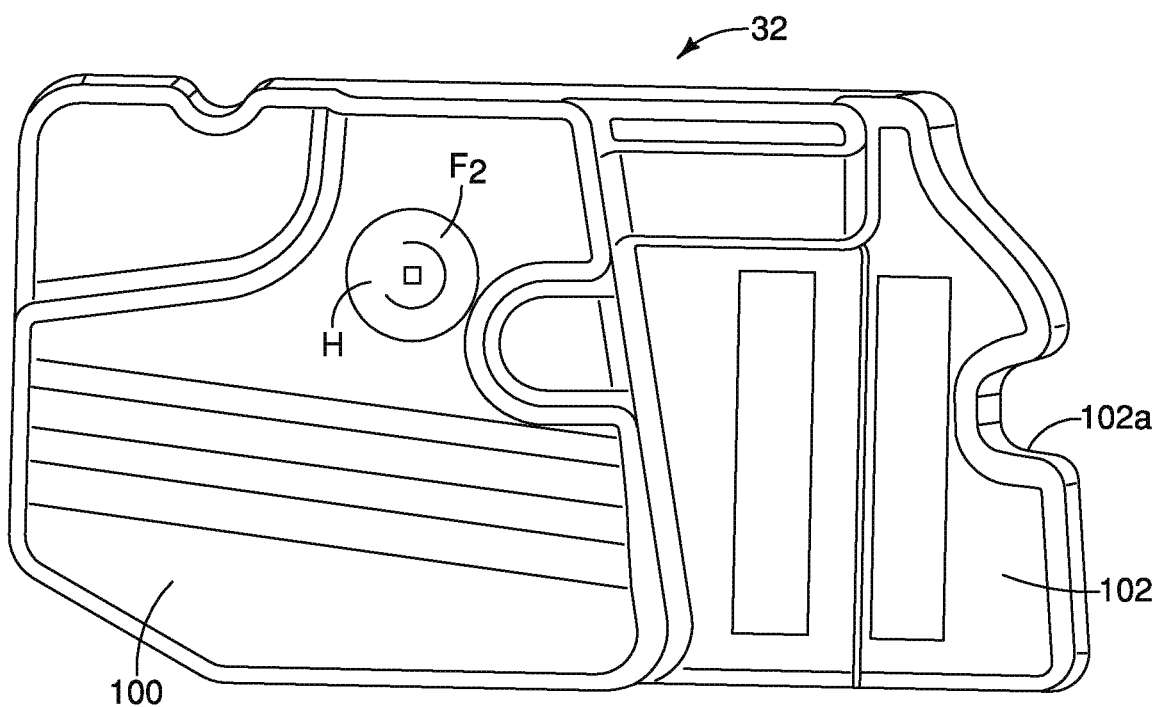
FIG. 14 is a side view of the second cushioning pad in accordance with the exemplary embodiment.
Figure 15:
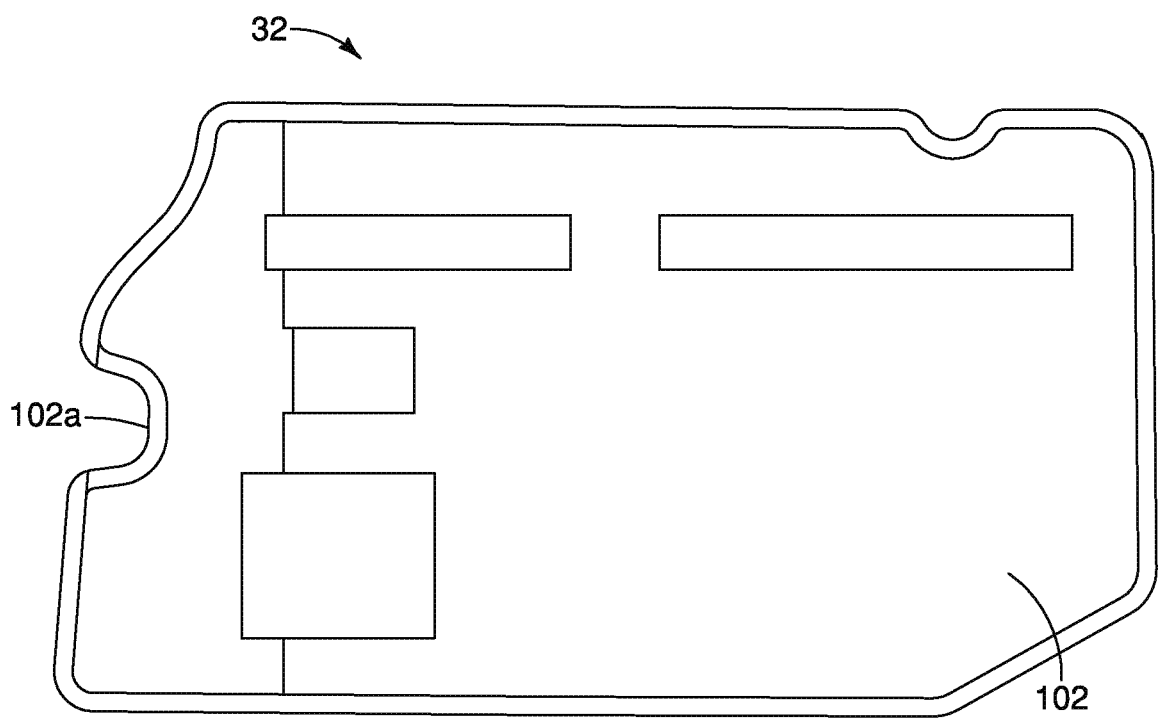
FIG. 15 is another side view of the second cushioning pad in accordance with the exemplary embodiment.

A description is now provided of the second pad 32 (also referred to as the second cushioning pad 32) with initial reference to FIGS. 12-15 and 20-23. The second pad 32 includes an inboard portion 100 and an outboard portion 102. An inboard surface of the inboard portion 100 of the second pad 32 includes a fastener $F_2$ extending therefrom. The fastener $F_2$ has a head portion H and a shaft portion S. The shaft portion S is retained within an opening (not shown) in the inboard portion 100 with the head portion H being spaced apart from the inboard portion 100, as shown in FIG. 13. The outboard portion 102 of the second pad 32 includes a gap 102a that exposes an adjacent area of the contoured section 74 of the pillar panel 42.

A description of the process of installing the first pad 30 is now provided with specific reference to FIGS. 16-18.

When the pillar panel 42 is installed to the inner door panel 28, the access opening 64 is covered and concealed from the outboard surface 54. The access opening 64 is therefore only be accessed from the inboard surface 56 of the inner door panel 28. As shown in FIG. 16, the first pad 30 is install into the pocket or recessed area 84 by first passing it through the access opening 64 in the inboard surface 56 of the inner door panel 28, into the hollow interior of the B-Pillar structure 80, and thereafter into the pocket or recessed area 84 between the outboard surface 54 of the inner door panel 28 and the offset portion 82 of the pillar panel 42.

As shown in FIGS. 17 and 18 (with the inner door panel 28 removed for clarity), the first pad 30 is moved from the hollow interior of the hollow B-pillar structure 80 and into the pocket or recessed area 84. When physical insertion of the first pad 30 into the recessed area 84 is completed, only the main body 90 of the first pad 30 is located within the recessed area 84. The attachment flange 92, which extends perpendicular from the main body 90, is located outside of the recessed area 84. The opening 94 in the attachment flange 92 of the first pad 30 is positioned in alignment with the opening 96 in the pillar panel 42. Thereafter, the fastener $F_1$ is inserted through the opening 94 and into the opening 96 of the pillar panel 42, thus retaining the first pad 30 in position within the pocket or recessed area 84. Additionally, double sided tape and/or a mastic or adhesive material can be applied to the first pad 30 and/or the surfaces that define the pocket or recessed area 84.

A description of the process of installing the second pad 32 is now provided with specific reference to FIGS. 19-23.

Figure 19:
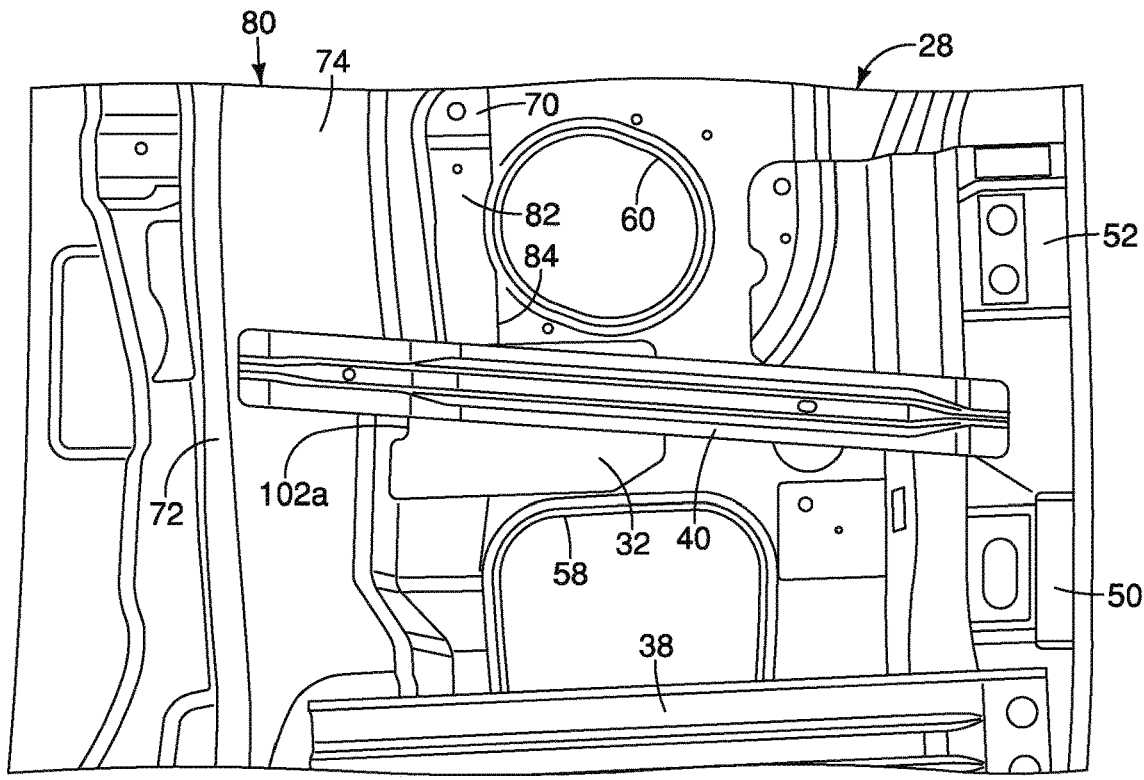
FIG. 19 is a view of the rear door from an outboard side thereof showing the outboard surface of the inner door panel, the pillar panel, the stiffener, the guard beam and the second cushioning pad installed with a portion of the stiffener (a guard beam) overlaying a portion of the second cushioning pad in accordance with the exemplary embodiment.
Figure 20:
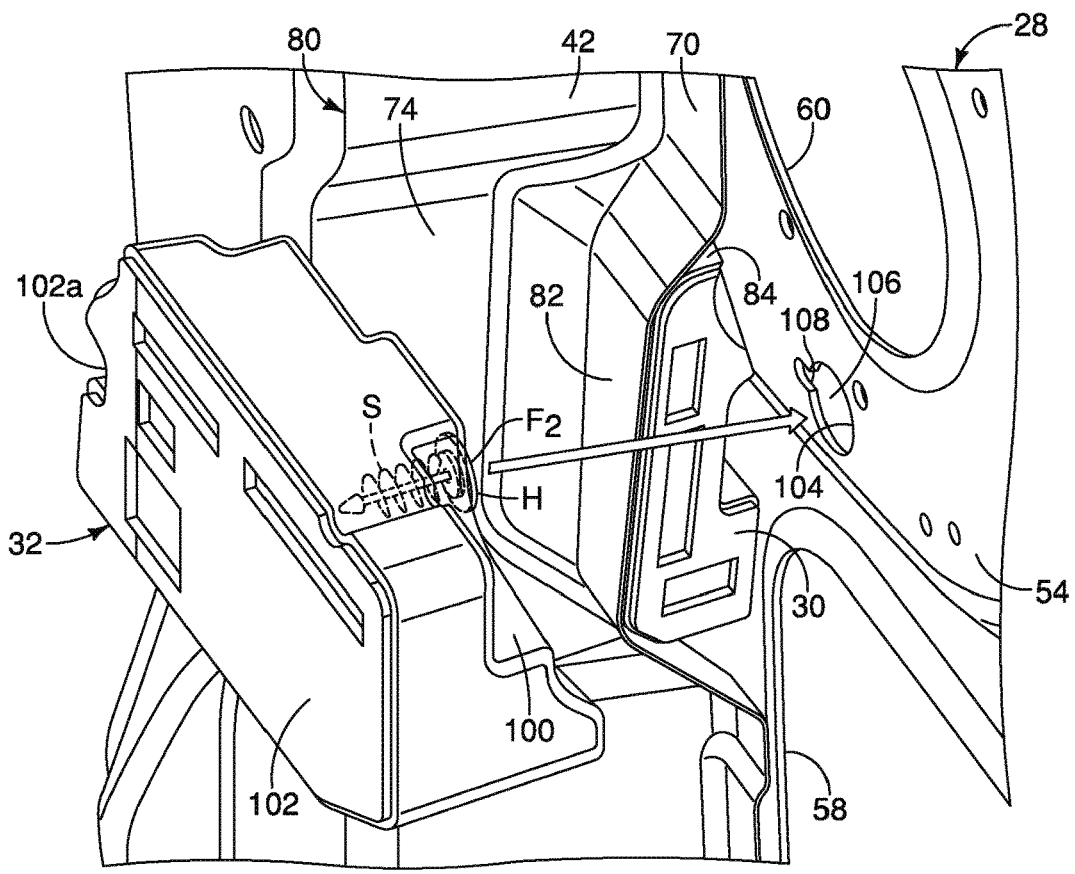
FIG. 20 is a perspective view of the rear door from the outboard side thereof showing the second cushioning pad being positioned for installation to the outboard surface of the inner door panel in accordance with the exemplary embodiment.
Figure 21:
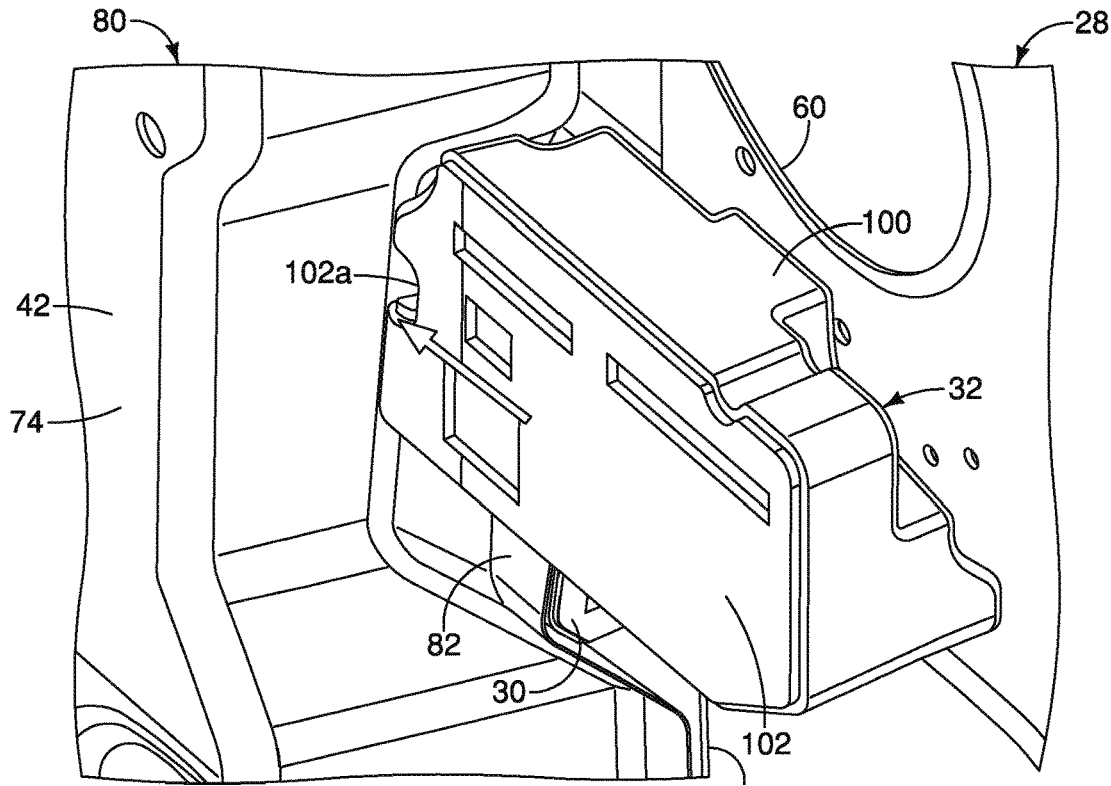
FIG. 21 is another perspective view of the rear door similar to FIG. 20 showing the second cushioning pad moved to a position adjacent to the inner door panel and a portion of the pillar panel positioned for final installation to the outboard surface of the inner door panel in accordance with the exemplary embodiment.
Figure 22:
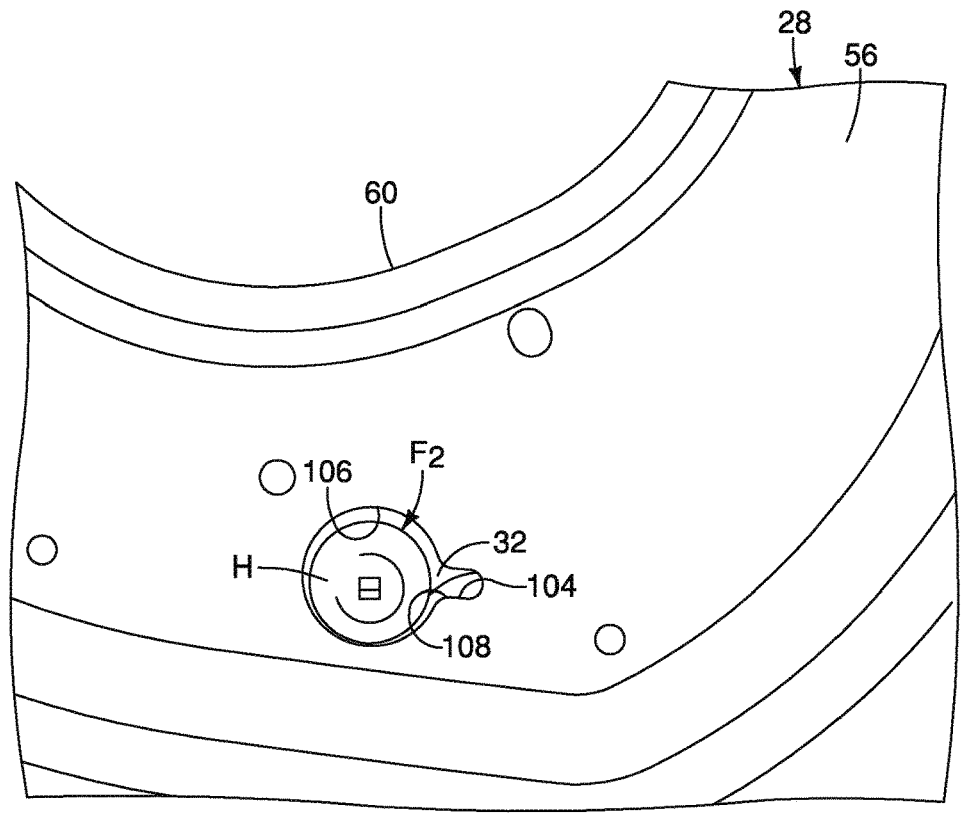
FIG. 22 is an inboard side view of the rear door showing the head of a fastener of the second cushioning pad inserted into a first section (a large section) of a slot defined in the inner door panel in accordance with the exemplary embodiment.
Figure 23:
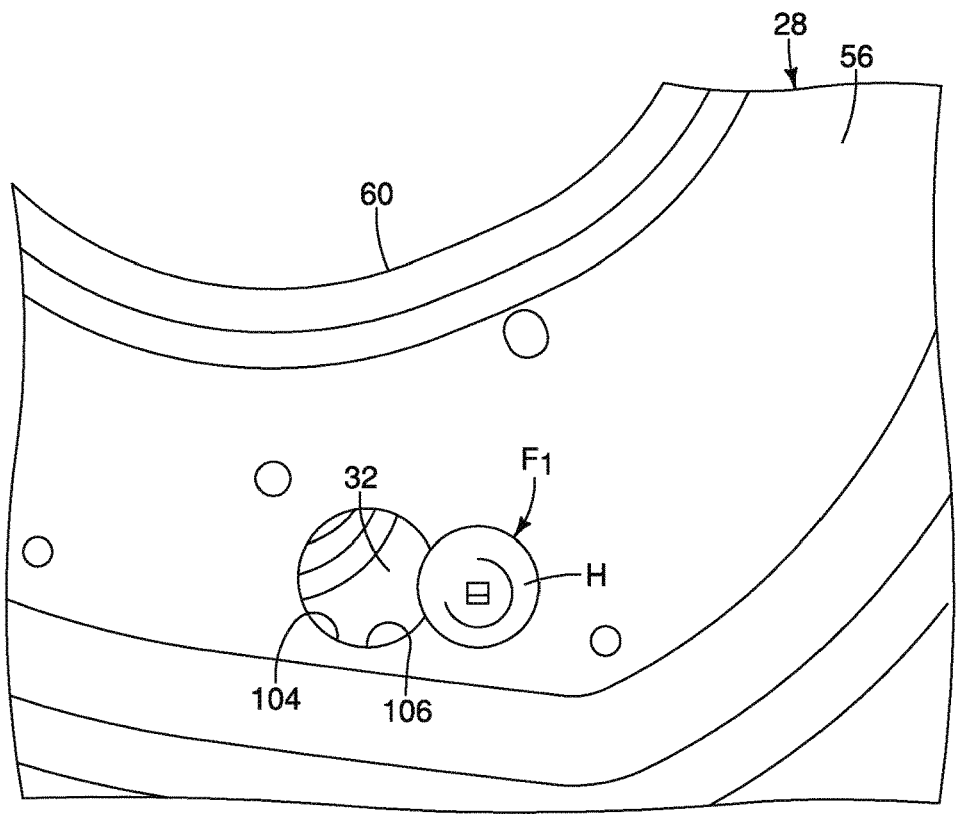
FIG. 23 is another inboard side view of the rear door similar to FIG. 22 showing the head of the fastener of the second cushioning pad moved into a second section (a narrow section) of the slot defined in the inner door panel as a result of movement of the second cushioning pad toward the pillar panel, thereby fully installing the second cushioning pad to the rear door in accordance with the exemplary embodiment.

The second pad 32 can be installed prior to fixing of the outer door panel 44 to the inner door panel 28, or, can be installed after installation of the outer door panel 44 to the inner door panel 28. If installed after the outer door panel 44 is installed, the second pad 32 can be inserted into the hollow interior of the rear door 18 via the lower opening 58 in the inner door panel 28. Thereafter, the second pad 30 is positioned adjacent to the pillar panel 42, as shown in FIG. 20. As shown in FIG. 21, the second pad 30 is them oved toward the outboard surface 54 of the inner door panel 28. The head portion H of the fastener $F_2$ is then fitted into the first section 106 (the larger section) of the slot 104 in the inner door panel 28, as indicated in FIG. 21 and shown in FIG. 22. Thereafter, the second pad 30 is moved toward the pillar panel 42 thereby also moving the head portion H of the fastener $F_2$ such that the shaft portion S is located in the second section 108 (smaller section) of the slot 104 of the inner door panel 28, as shown in FIG. 23. Various surfaces of the second pad 32 can be provided with double sided tape and/or a mastic/adhesive material thereby fixing the second pad 32 in position as shown in FIG. 19. As is also shown in FIG. 19, when fully installed to the inner door panel 28, the stiffener 40 overlays the second pad 32. It should be understood from the drawings and the description herein that the stiffener 40 can be spaced apart from the second pad 32.

Figure 24:
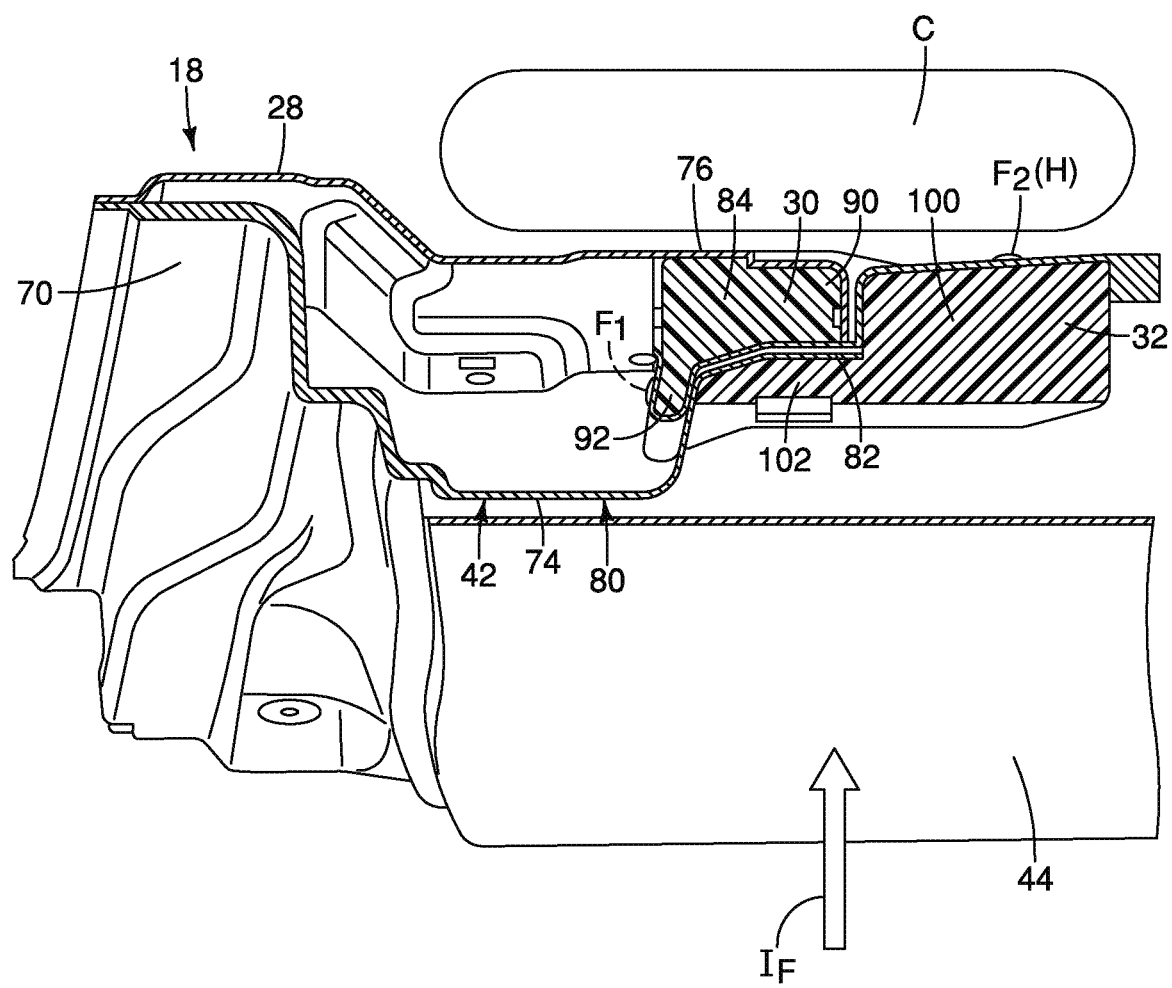
FIG. 24 is a cross-sectional view of the rear door taken along the line 24-24 in FIG. 4 showing an overlap between the first cushioning pad and the second cushioning pad with the offset portion of the pillar panel separating the first cushioning pad from the second cushioning pad in accordance with the exemplary embodiment.

As shown in FIG. 24, the outboard portion 102 of the second pad 32 overlaps a portion of the main body 90 of the first pad 30. However, the first pad 30 and the second pad 32 are separated by the offset portion 82 of the first attachment flange 70 of the pillar pane 42. Thus, in the event of an impact event where an impacting force IF acts upon the rear door 18, the force first acts on the second pad 32, which is more dense and stiffer than the first pad 30. Thereafter, force might act on the first pad 30. In other words, one or both of the first and second pads 30 and 32 can receive at least a portion of the impact force IF, absorbing at least a portion of that force thereby reducing and/or eliminating force that might otherwise cause sufficient deformation of the rear door 18 to cause impact or contact with cargo C located on a rear seat (not shown) of the vehicle 10.

In the above described embodiment, the first cushioning pad 30 has a first density that provides the first cushioning pad 30 with a first level of compressibility. The second cushioning pad 32 has a second density that provides the second cushioning pad 32 with a second level of compressibility, such that the second cushioning pad 32 has a greater resistance to compression than the first cushioning pad 30.

The vehicle body structure 12 of the vehicle 10, other than the above described elements of the rear door 18, includes a variety of conventional components and structures that are well known in the art. Since these conventional components and structures are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The term "configured" as used herein to describe a component, section or part of a device includes structure and or elements that are constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door assembly, comprising
   an inner door panel having an attachment area, a first edge portion and a second edge portion, the first edge portion defining hinge attachment locations;
   a pillar panel fixedly attached to at least the second edge portion and the attachment area such that the inner door panel and the pillar panel define a hollow B-pillar structure, the pillar panel further including an offset portion that is spaced apart from a central portion of the attachment area of the inner door panel defining a recessed area therebetween; and
   a first cushioning pad having a main body installed within the recessed area between the offset portion of the pillar panel and the inner door panel.

2. The vehicle door assembly according to claim 1, wherein
   the first cushioning pad includes an attachment flange that extends perpendicular to the main body, the attachment flange being located outside of the recessed area and being attached to an offset area of the pillar panel.

3. The vehicle door assembly according to claim 2, wherein
   the attachment flange of the first cushioning pad includes a first opening and the offset area of the pillar panel includes a second opening with a mechanical fastener extending through the first opening and the second opening fixing the first cushioning pad to the inner door panel.

4. The vehicle door assembly according to claim 3, further comprising
   an outer door panel attached to at least the first edge portion and the second edge portion of the inner door panel covering and concealing the pillar panel and outboard portions of the recessed area.

5. The vehicle door assembly according to claim 4, further comprising
   a second cushioning pad having an inboard portion and an outboard portion with the inboard portion being attached to the inner door panel and the outboard portion being located between the offset portion of the pillar panel and the outdoor panel.

6. The vehicle door assembly according to claim 5, wherein
   the inboard portion includes a fastener having a shaft portion and a head portion, the head portion being spaced apart from the inboard portion with the shaft portion extending therebetween, and
   the inner door panel includes a slot spaced apart from the recessed area, the slot having a first end and a second end, the first end being larger that the second end such that the head portion of the fastener of the inboard portion is inserted into the first end, and with the inboard portion of the second cushioning portion being moved toward the recessed area, the shaft portion is moved into the second end of the slot such that the fastener retains the second cushioning pad to the inner door panel.

7. The vehicle door assembly according to claim 5, wherein the first cushioning pad has a first density that provides the first cushioning pad with a first level of compressibility, and the second cushioning pad has a second density that provides the second cushioning pad with a second level of compressibility, such that the second cushioning pad has a greater resistance to compression than the first cushioning pad.

8. The vehicle door assembly according to claim 5, further comprising a first hinge mechanism dimensioned and configured to attach to one of the hinge attachment locations of the inner door panel; and a second hinge mechanism attached to another of the hinge attachment locations of the door panel in vertical alignment with the first hinge mechanism.

9. The vehicle door assembly according to claim 8, further comprising a guard beam having a first end and a second end such that a portion of the guard beam overlays the second cushioning pad such that the outer door panel covers and conceals the guard beam.

10. The vehicle door assembly according to claim 1, further comprising an outer door panel attached to at least the first edge portion and the second edge portion of the inner door panel covering and concealing the pillar panel and outboard portions of the recessed area.

11. The vehicle door assembly according to claim 10, further comprising a second cushioning pad having an inboard portion and an outboard portion with the inboard portion being attached to the inner door panel and the outboard portion being located between the offset portion of the pillar panel and the outdoor panel.

12. The vehicle door assembly according to claim 11, wherein the inboard portion includes a fastener having a shaft portion and a head portion, the head portion being spaced apart from the inboard portion with the shaft portion extending therebetween, and the inner door panel includes a slot spaced apart from the recessed area, the slot having a first end and a second end, the first end being larger that the second end such that the head portion of the fastener of the inboard portion is inserted into the first end, and with the inboard portion of the second cushioning portion being moved toward the recessed area, the shaft portion is moved into the second end of the slot such that the fastener retains the second cushioning pad to the inner door panel.

13. The vehicle door assembly according to claim 12, further comprising a first hinge mechanism dimensioned and configured to attach to one of the hinge attachment locations of the inner door panel; and a second hinge mechanism attached to another of the hinge attachment locations of the door panel in vertical alignment with the first hinge mechanism.

14. The vehicle door assembly according to claim 13, further comprising a guard beam having a first end and a second end such that a portion of the guard beam overlays the second cushioning pad such that the outer door panel covers and conceals the guard beam.

15. The vehicle door assembly according to claim 11, wherein the first cushioning pad has a first density that provides the first cushioning pad with a first level of compressibility, and the second cushioning pad has a second density that provides the second cushioning pad with a second level of compressibility, such that the second cushioning pad has a greater resistance to compression than the first cushioning pad.

16. The vehicle door assembly according to claim 1, wherein the first edge portion of the inner door panel is located at a rearward end of the inner door panel and the second edge portion of the inner door panel is located at a forward end of the inner door panel.

\* \* \* \* \*